Sept. 18, 1962  HANS-JOACHIM KLEINSCHMIDT  3,054,276
RUBBER ELASTIC COUPLING FOR UNIVERSAL
JOINT SHAFTS AND THE LIKE
Filed Aug. 9, 1960
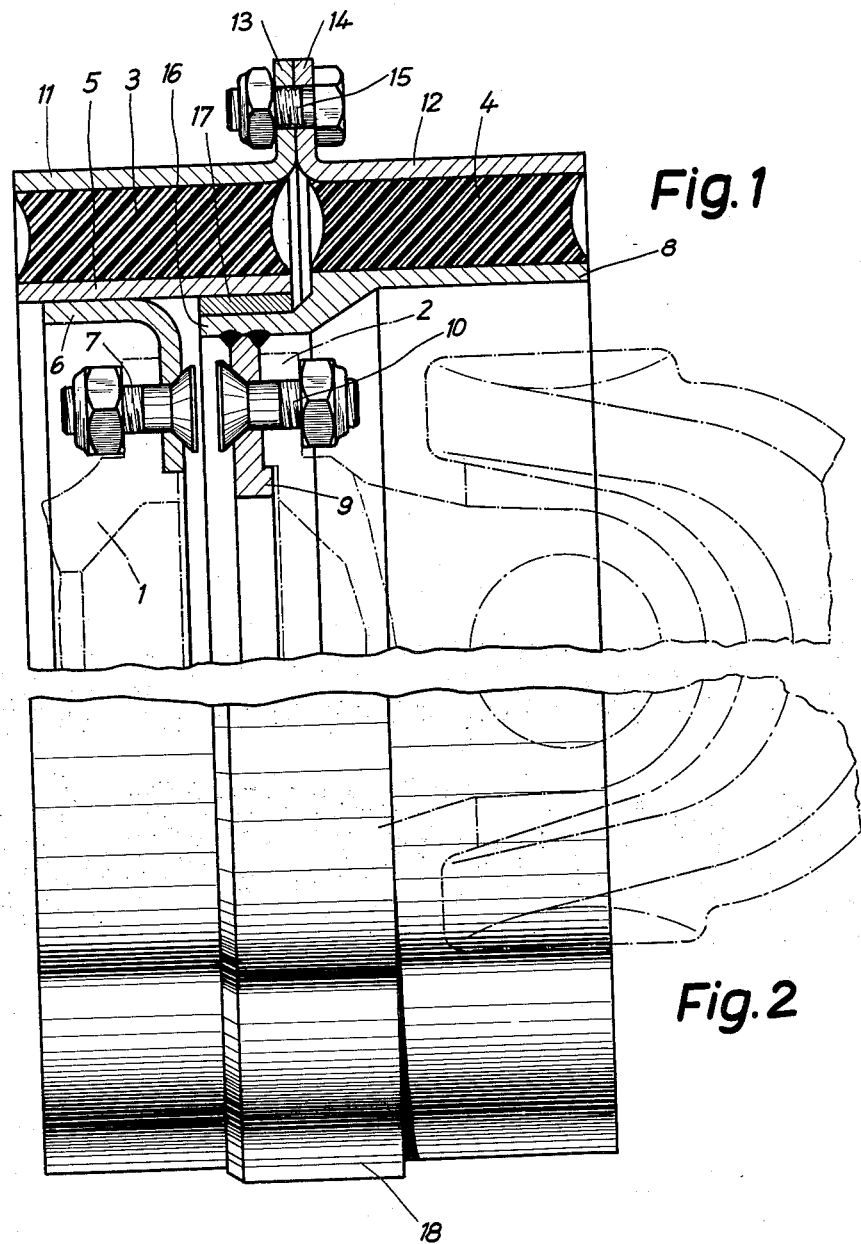
INVENTOR.
Hans-Joachim Kleinschmidt
BY
Patent Agent

3,054,276
RUBBER ELASTIC COUPLING FOR UNIVERSAL JOINT SHAFTS AND THE LIKE

Hans-Joachim Kleinschmidt, Essen, Germany, assignor to Gelenkwellenbau G.m.b.H., Essen, Germany
Filed Aug. 9, 1960, Ser. No. 48,546
Claims priority, application Germany Aug. 12, 1959
3 Claims. (Cl. 64—27)

The present invention relates to universal joint shafts and, more specifically, concerns a rubber elastic coupling for universal joint shafts and the like.

It is well known that the connecting flange and the universal joint flange of such coupling are each provided with an annular rubber element and that the rubber elements are connected to each other. With couplings of this type it has also been suggested to provide a centering ring between said two flanges which centering ring may preferably be made of polyamide. Such an arrangement has, however, the drawback that the insertion of said centering ring is rather cumbersome and time-consuming.

It is, therefore, an object of the present invention to provide an improved coupling of the above mentioned type which will simplify the connection of the coupling elements.

It is also an object of this invention to provide an arrangement of the type set forth above which will greatly facilitate the insertion of the centering ring referred to above.

These and other objects and advantages of the invention will appear more clearly from the following specification in connection with the accompanying drawing, in which:

FIG. 1 illustrates a section through a coupling according to the present invention.

FIG. 2 shows in view a slight modification of a detail of FIG. 1.

The coupling according to the invention for universal joint shafts and the like in which the connecting flange and the universal joint flange are each provided with an annular rubber element and in which the rubber elements are connected to each other while a centering ring is mounted between said two flanges, is characterized primarily in that the centering ring is arranged between inner reinforcing members for said rubber elements. Such an arrangement considerably simplifies the assembly of a coupling of the type involved and also results in a simpler construction of the centering arrangement.

According to a further development of the invention, the inner reinforcing means of one of the rubber elements may be provided with a collar extending into the inner reinforcing means of the other rubber element, said collar carrying the centering ring.

Referring now to the drawing in detail, the end (indicated in dot dash lines) of the universal joint shaft is provided with a flange 1, whereas the universal joint has a flange 2. For purposes of connecting the universal joint shaft with the universal joint, there is provided a coupling formed primarily by two annular rubber elements 3 and 4. The rubber element 3 is reinforced by an inner reinforcing member 5 which latter has connected thereto, for instance by welding, a flange 6 which in its turn is connected by bolt 7 with flange 1 of the universal joint shaft. Similarly, the rubber element 4 is provided with an inner reinforcing member 8 which latter has connected thereto in any convenient manner, for instance by welding, a ring 9 connected to flange 2 of the universal joint by means of bolts 10.

As will be evident from the drawing, the two rubber elements 3 and 4 are furthermore respectively provided with outer reinforcing members 11 and 12. These elements 11 and 12 have flanges 13 and 14 respectively which extend outwardly and may be connected to each other by means of bolts 15 (one only being shown). However, if desired the flanges 13 and 14 instead of being connected by bolts 15 may be connected by a shrink ring 18 as shown in FIG. 2.

In conformity with the present invention, the inner reinforcing member 8 for the rubber member 4 is provided with a collar 16 which extends into the inner reinforcing member 5 of the rubber element 3. In this way, a centering ring 17 may be arranged between said collar 16 and the inner surface of the inner reinforcing member 5. This centering ring 17, which will absorb torque stresses, simultaneously serves as bearing means and will permit a certain torsion of the universal joint shaft relative to the universal joint.

It is, of course, to be understood that the present invention is, by no means, limited to the particular construction shown in the drawing but also comprises any modifications within the scope of the appended claims.

What I claim is:

1. In a coupling system for coupling two elements together, especially for universal joint shafts: a first outer annular member, a first inner annular member arranged within said first outer annular member in spaced relationship thereto and connected to one of said two elements, a first rubber elastic member interposed between said first inner and outer annular members, a second outer annular member, a second inner annular member connected to the other one of said two elements and surrounded by said second outer annular member in spaced relationship thereto, a second rubber elastic member interposed between said second outer and inner annular members, a cylindrical centering ring interposed between said first and second inner annular members so as to axially align the same, and connecting means connecting said first and second outer annular members to each other.

2. In a coupling system for coupling two elements together, especially for universal joint shafts: a first outer annular member, a first inner annular member arranged within said first outer annular member in spaced relationship thereto and connected to one of said two elements, a first rubber elastic member interposed between said first inner and outer annular members, a second outer annular member, a second inner annular member connected to the other one of said two elements and surrounded by said second outer annular member in spaced relationship thereto, a second rubber elastic member interposed between said second outer and inner annular members, one of said inner annular members being provided with a collar extending into the other inner annular member in spaced relationship thereto, a cylindrical centering ring interposed between said other inner annular members and said collar so as to axially align the same, and connecting means connecting said first and second outer annular members to each other.

3. In a coupling system for coupling two elements together, especially for universal joint shafts: a first outer annular member, a first inner annular member arranged within said first outer annular member in spaced relationship thereto and connected to one of said two elements, a first rubber elastic member interposed between said first inner and outer annular members, a second outer annular member, a second inner annular member connected to the other one of said two elements and surrounded by said second outer annular member in spaced relationship thereto, a second rubber elastic member interposed between said second outer and inner annular members, one of said inner annular members being provided with a collar extending into the other inner annular member in spaced relationship thereto, a cylindrical centering ring interposed between said other inner annular members and said collar so as to axially align the same, connecting means connecting said first and second outer annular members to each other, each of said two elements being provided with flanges respectively arranged within said first and second inner annular members in face to face but spaced relationship with regard to each other, and means respectively connected to said first and second inner annular members and respectively connected to said flanges.

References Cited in the file of this patent

UNITED STATES PATENTS

| | | |
|---|---|---|
| 1,606,514 | Crist | Nov. 9, 1926 |
| 2,084,080 | D'Aubarede | June 15, 1937 |
| 2,084,761 | Bradley | June 22, 1937 |
| 2,592,309 | Meier | Apr. 18, 1952 |
| 2,691,283 | Stover | Oct. 12, 1954 |
| 2,765,638 | Schaefer | Oct. 9, 1956 |

FOREIGN PATENTS

| | | |
|---|---|---|
| 848,667 | France | July 3, 1939 |
| 606,581 | Great Britain | Aug. 17, 1948 |